United States Patent
Amante et al.

(10) Patent No.: US 8,441,254 B2
(45) Date of Patent: May 14, 2013

(54) ENCODER USING MAGNET DROP OUT FEATURE FOR THEFT DETECTION

(75) Inventors: Philip A. Amante, Poquoson, VA (US); Jeffrey Creak, Hampton, VA (US)

(73) Assignee: Measurement Specialties, Inc., Hampton, VA (US)

( * ) Notice: Subject to any disclaimer, the term of this patent is extended or adjusted under 35 U.S.C. 154(b) by 20 days.

(21) Appl. No.: 12/952,496

(22) Filed: Nov. 23, 2010

(65) Prior Publication Data

US 2011/0148399 A1     Jun. 23, 2011

Related U.S. Application Data

(60) Provisional application No. 61/289,756, filed on Dec. 23, 2009, provisional application No. 61/291,506, filed on Dec. 31, 2009.

(51) Int. Cl.
*G01B 7/30*     (2006.01)
*G01B 7/14*     (2006.01)

(52) U.S. Cl.
USPC ............................ 324/207.25; 324/207.24

(58) Field of Classification Search . 324/207.24–207.26
See application file for complete search history.

(56) References Cited

U.S. PATENT DOCUMENTS

| | | | |
|---|---|---|---|
| 5,144,977 A * | 9/1992 | Eggerton et al. | ............... 137/554 |
| 5,313,159 A | 5/1994 | Allwine, Jr. | |
| 6,109,477 A | 8/2000 | Myers et al. | |
| 6,556,005 B1 | 4/2003 | Oomkes | |
| 2008/0150238 A1 | 6/2008 | Yarimizu et al. | |

FOREIGN PATENT DOCUMENTS

WO     2004079385 A1     9/2004

OTHER PUBLICATIONS

International Search Report dated Feb. 16, 2011 for related PCT application No. PCT/US2010/059340.

* cited by examiner

*Primary Examiner* — Bot Ledynh
(74) *Attorney, Agent, or Firm* — Howard IP Law Group, PC

(57) ABSTRACT

An encoder to be mounted to a shaft extending from a piston meter configured to compute a volume of distributed fluid includes a magnet affixed to the shaft via a floating magnet holder, a magnetic sensor configured to sense the flux density and direction of a magnetic field created by the magnet and to output a signal indicating the flux density and direction of the magnetic field to a printed circuit board, and the printed circuit board configured to output a signal indicating the volume of distributed fluid if the encoder has not been tampered with and configured to output an error signal if the encoder has been tampered with.

22 Claims, 6 Drawing Sheets

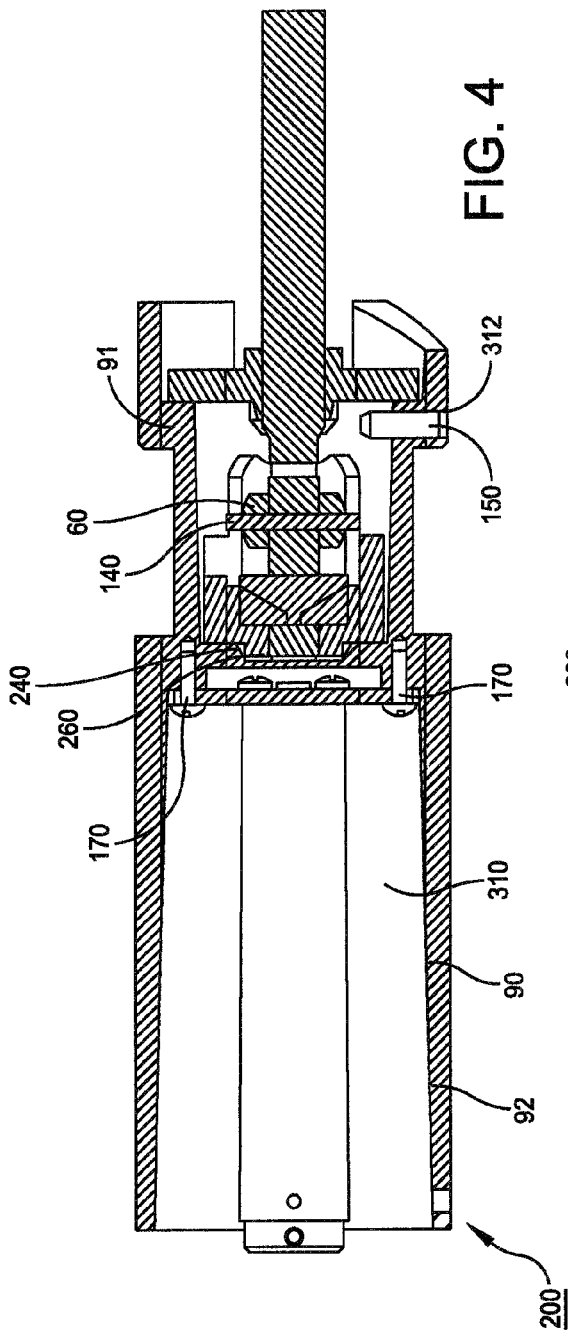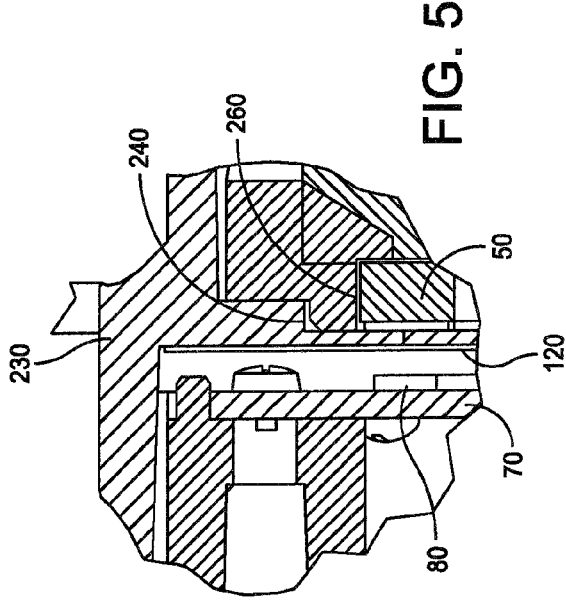

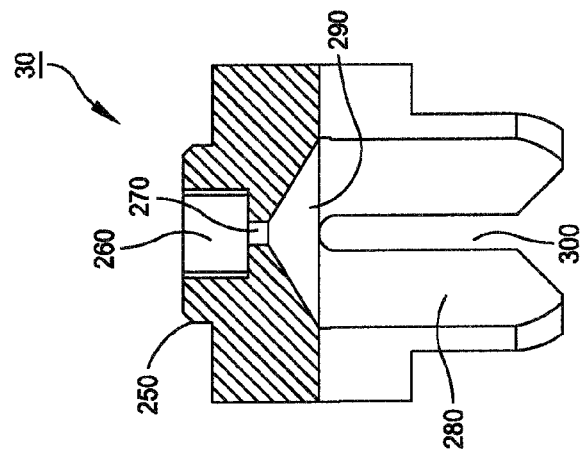
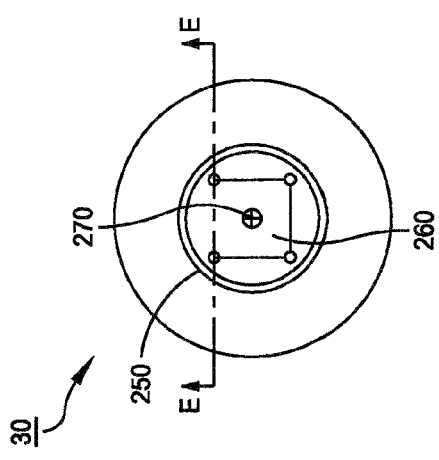
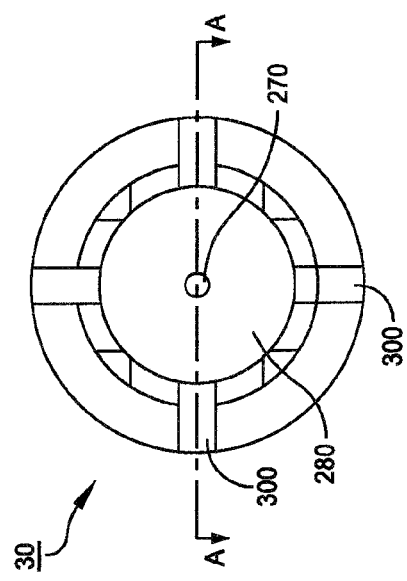

ENCODER USING MAGNET DROP OUT FEATURE FOR THEFT DETECTION

CROSS-REFERENCE TO RELATED APPLICATIONS

This application claims priority under 35 U.S.C. §119(e) to Provisional Patent Application Ser. No. 61/289,756 entitled "Encoder Using Magnet Drop Out Feature for Theft Detection" filed Dec. 23, 2009, and to Provisional Patent Application Ser. No. 61/291,506 entitled "Encoder Using Magnet Drop Out Feature for Theft Detection" filed Dec. 31, 2009 the subject matter thereof incorporated by reference in their entireties.

FIELD OF THE INVENTION

The present invention relates generally to fluid distribution systems, and more particularly, to encoders for measuring the output of fluid distribution systems.

BACKGROUND

Fluid distribution systems often implement encoders to measure quantities of distributed fluid. These encoders generally mate to a fluid metering device, by way of example, to a shaft of a piston meter, and operate to calculate the amount of distributed fluid by measuring the number of cycles or rotations of the piston meter. Traditional encoders may be mechanically disabled, preventing the fluid distribution system from accurately measuring the quantity of dispensed fluid. For example, a thief may mechanically disconnect the encoder from the piston meter in a fuel distribution system while leaving the encoder electronically connected to the system. Such a modification would allow the continued output of fuel. However, with the encoder-piston arrangement disconnected, the system would fail to accurately detect the volume of fuel distributed, as well as the corresponding payment owed therefore.

Magnetic-based encoders typically operate by mechanically affixing a magnet to the rotatable shaft and having a sensor positioned relative to the magnet-shaft for measuring a change in the magnetic field (e.g. a change in the direction of the magnetic field) caused during rotation. Certain tampering techniques intended to defeat this arrangement include (in addition to removing the encoder discussed above) introducing, a powerful magnetic field into proximity with this arrangement. In particular, by introducing a high flux density magnetic field, such as by activating an electromagnet near the fuel distribution system, one may disrupt the magnetic sensor of the encoder from accurately reading the change in direction of the magnetic field caused by the rotating magnet, and thus may avoid paying the fair value for the distributed fuel.

Designs for a fuel distribution system that avoid vandalism, tampering, or theft may be limited by the operating environment of the system. In particular, encoders are generally located within the cabinet of a fuel distribution system. These systems are designed to be highly ventilated to allow leaked or spilled fuel to efficiently evaporate. This ventilation, however, allows for continued presence of fuel vapors around the encoders, limiting viable design options. For example, designs may avoid switches due to the risk of an electrical arc that may cause fuel vapors to ignite. Similarly, designs may avoid various mechanical interactions due to the risk of sparks caused by friction igniting fuel vapors.

Alternative tamper-resistant encoders adapted to operate in a highly combustible environment are desired.

SUMMARY

In an embodiment of the present invention, an encoder for a fluid dispensing system is provided. The encoder comprises a magnetic sensor configured to generate a first output signal indicative of a sensed magnetic field. A controller is responsive to the first output signal and configured to compare the first output signal to a predetermined threshold value. The controller may be further configured to generate a second output signal if the first output signal is above or below the threshold value. The threshold value may be indicative of a distance between a magnet rotatably connected to the output shaft of the fluid dispenser and the magnetic sensor. The magnet may be arranged so as to be moveable between a first position, wherein the encoder is installed on the fluid dispenser, and a second position, wherein the encoder is detached from the fluid dispenser.

Another embodiment of the present invention includes a method of operating an encoder for a fluid dispensing system. The method includes the steps of sensing a parameter of a magnetic field generated by the fluid dispensing system. This parameter of the magnetic field is compared to a predetermined threshold value. An output signal operable to disable the dispensing system is generated on the condition that the sensed parameter of the magnetic field is above or below the predetermined threshold value.

In another embodiment, an encoder to be mounted to a shaft extending from a piston meter configured to compute a volume of distributed fluid includes a magnet affixed to the shaft via a floating magnet holder, and a magnetic sensor configured to sense the flux density and direction of a magnetic field created by the magnet and to output a signal indicating the flux density and direction of the magnetic field to a printed circuit board. The printed circuit board is configured to compare the output signal from the magnetic sensor with a threshold value and output a signal indicating the volume of distributed fluid if the comparison yield a difference between the output signal and the threshold value within a predetermined acceptable range, indicating that the encoder has not been tampered with, and configured to output an error signal if the comparison yields a difference between the output signal and the threshold value that is not within the predetermined acceptable range, indicating the encoder has been tampered with.

BRIEF DESCRIPTION OF THE DRAWINGS

FIG. 4 is a cross-sectional view of the encoder of FIG. 1 bisected along line DD.

FIG. 5 is a more detailed cross-sectional view of section CC of FIG. 3.

FIG. 6a is a top perspective view of the magnet holder of FIG. 3.

FIG. 6b is a bottom perspective view of the magnet holder of FIG. 3.

FIG. 6c is a cross-sectional view of the magnet holder of FIG. 3 bisected along line A.

DETAILED DESCRIPTION

Figure 2:
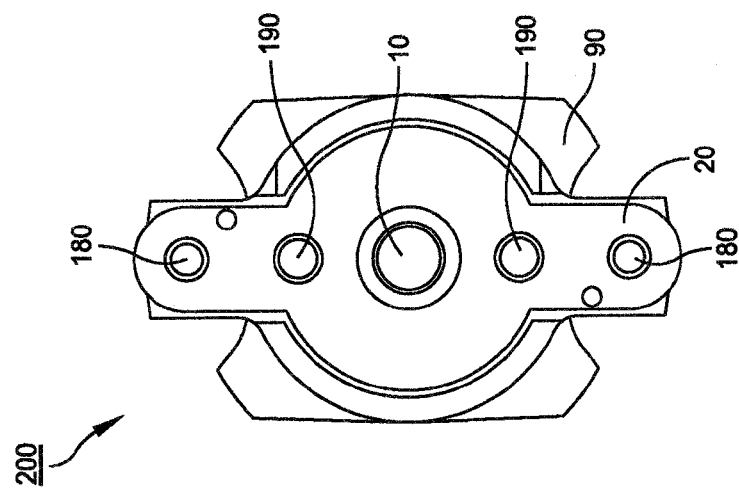
FIG. 2 is a bottom perspective view of the encoder of FIG. 1.

It is to be understood that the figures and descriptions of the present invention have been simplified to illustrate elements that are relevant for a clear understanding of the present invention, while eliminating, for purposes of clarity, many other elements found in fluid dispensing systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

An embodiment of the present invention includes an encoder for fluid dispensing systems designed to determine when the encoder has been removed from the dispensing mechanism. The encoder may comprise a magnet holder arranged on a shaft of, for example, a piston meter. The magnet is mounted and positioned so as to change the direction of a magnetic field as the shaft rotates. The encoder also may include a printed circuit board (PCB) on which a magnetic sensor is positioned relative to the magnet. The magnetic sensor is configured to detect one or more parameters associated with the magnetic field, such as changes in the flux density and direction of the magnetic field output by the magnet as the shaft rotates. The sensor may substantially continuously output to the PCB signals representing one or more of the flux density and direction of the magnetic field. The encoder may be configured to output a series of pulses indicative of rotation of the shaft and corresponding volume of fluid distributed.

In one embodiment, the magnet holder is mounted within the encoder in a floating fashion, thereby allowing the distance between the magnet and the sensor to vary due to gravity. Upon installation of the encoder, the shaft extending vertically from a piston meter positions the magnet at a given distance from the sensor. Throughout operation of the encoder, the magnetic sensor detects changes in the magnetic field as the shaft rotates. During normal operation, the distance between the rotating magnet and the magnet sensor remains substantially the same (e.g. varies by less than about 0.02-0.04 inches). Due to the relative invariance in distance, the changes in flux density result substantially from shaft rotation. However, if the sensor detects a change in the flux density of the magnetic field indicative of the movement of the magnet relative to the sensor in an axial direction greater than a predetermined threshold distance (e.g. 0.02-0.04 inches), the PCB is configured to transmit an error signal to a controller of the fuel dispenser.

As a result of the floating magnet arrangement, removing the encoder from the fuel dispenser permits the magnet to move at least the threshold distance from the magnetic sensor under the force of gravity, thereby triggering transmission of the error signal. This movement of the magnet under the force of gravity responsive to the removal of the encoder may be described as a magnet drop out feature. Upon receipt of an error signal from the PCB, the controller of the fuel dispenser may be configured to shut off the pump of the fuel dispenser. The pump will then remain off until a reset code is entered to reset the system. This may be performed, by way of example, by an employee of the fuel station.

Figure 1:
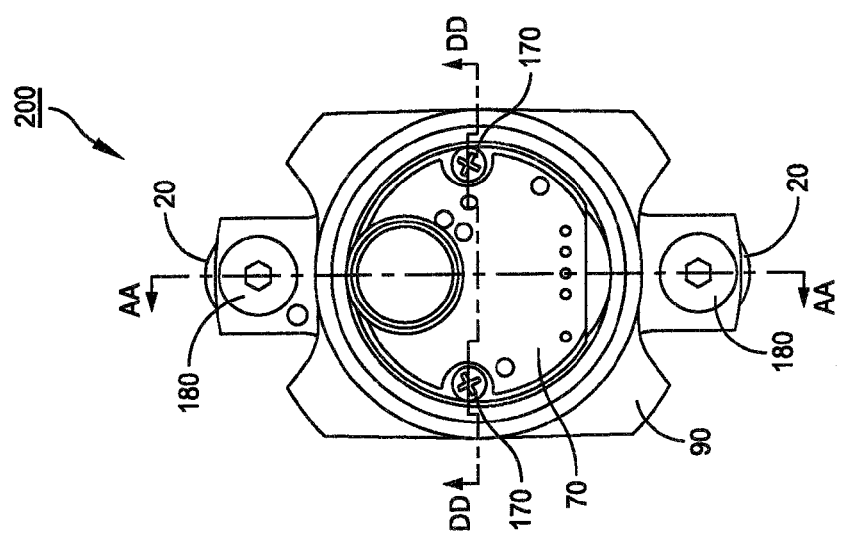
FIG. 1 is a top perspective view of an encoder according to an exemplary embodiment of the present invention.

FIG. 1 is a top perspective view of an encoder 200 according to an exemplary embodiment of the present invention. The encoder 200 may comprise a housing 90, generally shaped as an elongated cylinder having projections configured for mating with or mounting to a commercially available piston meter. Housing 90 may comprise a rigid material, for example a metal such as aluminum or an aluminum alloy and may be manufactured in conventional fashion, such as by casting, forging and/or machining by way of non-limiting example.

Figure 3:
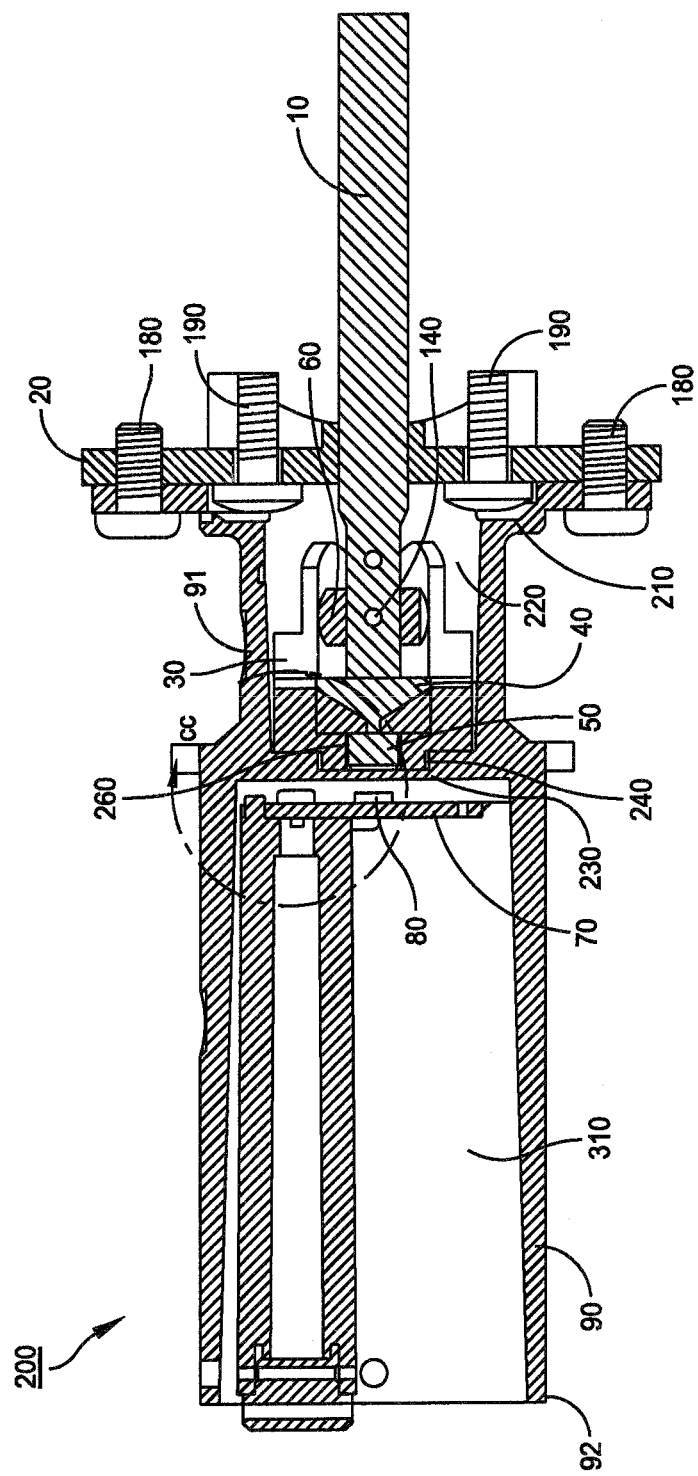
FIG. 3 is a cross-sectional view of the encoder of FIG. 1 bisected along line AA.

As shown in greater detail in FIGS. 3 and 4, a first end 91 of housing 90 may be mounted to a seal retainer 20 on a mounting surface of a piston meter (piston meter not shown in the figures other than shaft 10 extending therefrom) via conventional mounting means, by way of example only, mounting screws 180. Seal retainer 20 may comprise a plate or gasket for sealing the interface between mating surfaces and securing a seal within the piston meter.

Encoder 200 includes a printed circuit board (PCB) 70 mounted within a PCB cavity 310 (FIG. 3) defined in a second end 92 of housing 90 distal from the first end 91. PCB 70 may be mounted via conventional mounting means, such as via PCB mounting screws 170. Housing 90 may also include threaded bores configured to receive PCB mounting screws 170.

FIG. 2 is a bottom perspective view of encoder 200. As set forth above, housing 90 may be mounted to seal retainer 20 via mounting screws 180 (threaded end of mounting screws 180 shown). Shaft 10 extends from the piston meter through seal retainer 20 and into the interior of housing 90 to engage with a magnet holder 30 (FIG. 3). Shaft 10 is configured to rotate at a rate corresponding to an amount of fluid passing through the piston meter, by way of non-limiting example, at a rotation rate of up to 500 rotations per minute (RPMs) or up to 10,000 RPMs for an axial flow meter. One or more seal retainer screws 190 may secure seal retainer 20 against a mounting surface of the piston meter.

FIG. 3 is a cross-sectional view of encoder 200 bisected along line AA of FIG. 1. As described above with reference to FIGS. 1 and 2, seal retainer 20 may be mounted to an outer surface of the piston meter via seal retainer screws 190. The first end 91 of housing 90 may be mounted to seal retainer 20 via mounting screws 180. The mating surface of housing 90 contacting seal retainer 20 may be configured to provide one or more recesses 210 operative to prevent contact between housing 90 and seal retainer screws 190, thereby allowing a surface of housing 90 to be mounted flush to a surface of seal retainer 20. Flush mounting may provide a sealed interface between encoder 200 and the piston meter to minimize potential fuel leakage.

The first end 91 of housing 90 defines a magnet cavity 220. Magnet cavity 220 may comprise the hollow inner portion of housing 90 spanning from the first end 91 to a cavity separating wall 230. A first end of magnet cavity 220 near seal retainer 20 may be substantially open, thereby allowing the magnet holder 30 to be slideably inserted therein. A surface of cavity separating wall 230 defines a second end of magnet cavity 220 opposite seal retainer 20. The surface of cavity separating wall 230 facing seal retainer 20 may include a cylindrical recessed portion 240 centered on the surface. Recessed portion 240 may assist in aligning magnet holder 30 with a central axis of magnet cavity 220, thereby aligning a magnet 50 arranged within magnet holder 30 with magnetic sensor 80. The interior face of housing 90 defining the magnet cavity 220 as well as the face of housing 90 defining the edge of recessed portion 240 may have a slight draft (e.g. a −1.5° draft per side) facilitate the insertion of a portion of the magnet holder 30 within the recessed portion 240.

Referring generally to FIGS. 3, 6a, 6b and 6c, magnet holder 30 is configured to mount magnet 50 to the end of shaft 10 extending from the piston meter. A first end of magnet holder 30, configured to hold magnet 50, may be substantially flat with a cylindrical, uniformly-raised center region 250. Raised center region 250 may have a diameter slightly less than the diameter of the recessed portion 240 of separating wall 230 to assist in alignment of magnet 50 and magnetic sensor 80. Raised center region 250 may have a chamfer (e.g. a 45° chamfer) to further assist its insertion into recessed portion 240. Magnet holder 30 may be manufactured in conventional fashion from a rigid material, such as Derlin® AF Extended Wear sold by McMaster Carr.

Magnet holder 30 may comprise a magnet cutout 260 configured to allow insertion and retention of magnet 50. The shape and dimensions of magnet cutout 260 may closely correlate to the shape and dimensions of magnet 50. By way of example, FIG. 6a shows magnet holder 30 with a magnet cutout 260 configured to receive a magnet 50 having a square cross-section. Magnet cutout 260 may be configured to be slightly deeper than magnet 50, thereby allowing magnet 50 to be slightly recessed (e.g. recessed by about 0.02 in.). Magnet holder 30 may further include an adhesive vent hole 270 comprising a central bore through magnet holder 30 configured to allow an adhesive (e.g. a glue or an epoxy) to traverse the portion of magnet holder 30 between magnet cutout 260 and a shaft interface area 280.

Shaft interface area 280 (shown in FIGS. 6b and 6c) is integrally formed in magnet holder 30 opposite magnet cutout 260. Shaft interface area 280 may define a generally cylindrical cavity terminating at a semi-conical surface 290 configured to receive shaft 10. Shaft interface area 280 facilitates mounting magnet holder 30 and magnet 50 to shaft 10 such that magnet 50 rotates at the same rate as shaft 10. Exemplary encoders 200 may further include a universal-joint (U-joint) 60 (shown in FIG. 3) connected to both magnet holder 30 and shaft 10 via a U-joint pin 140. U-joint pin 140 may be a typical pin, such as a clevis pin, and may pass through slots 300 in magnet holder 30 and may pass through a bore in shaft 10, thereby ensuring magnet holder 30 and shaft 10 rotate together. U-joint 60 and U-joint pin 140 may be operative to compensate for slight angular variation or angular misalignment of shaft 10 with respect to encoder 200.

A foam puck 40 (FIG. 3) may be arranged within shaft interface area 280. Foam puck 40 may comprise a cushioning foam and is configured to maintain contact between the raised center region 250 of magnet holder 30 and the recessed portion 240 of cavity separating wall 230. By way of example, foam puck 40 may contract or expand to compensate for up to about 0.06 inches (0.06") of travel of shaft 10 while maintaining contact between raised center region 250 of magnet holder 30 and recessed portion 240 of cavity separating wall 230.

Magnet 50 and foam puck 40 may be adhered to magnet holder 30 for example, by gluing magnet 50 in place using an adhesive or epoxy, inserting foam puck 40 into shaft interface area 280 after gluing magnet 50, and allowing glue from magnet cutout 260 to traverse adhesive vent hole 170 thereby adhering a surface of foam puck 240 to semi-conical surface 290 of magnet holder 30. Foam puck 40 additionally serves to prevent excess adhesive from entering shaft interface area 280.

Magnet holder 30, having magnet 50 and foam puck 40 adhered thereto, may be installed within magnet cavity 220 of housing 90 before the encoder 200 is mounted to seal retainer 20 and corresponding piston meter. Magnet holder 30 may be inserted into magnet cavity 220 such that the end of magnet holder 30 containing magnet 50 enters magnet cavity 220 first. Magnetic holder 30 may be slidably arranged within the magnet cavity 220. As may be seen in FIG. 4, upon full insertion of magnet holder 30 into magnet cavity 220, a retaining device such as roll pin 150 may be inserted (e.g. press fit) through a roll pin bore 310 such that an end of roll pin 150 projects into magnet cavity 220 a sufficient distance to prevent magnet holder 30 from being removed from magnet cavity 220 but not so far as to prevent shaft 10 from being inserted into shaft interface 280 of magnet holder 30. By way of example, roll pin 150 may be press fit through roll pin bore 312 such that the roll pin 150 extends into the magnet cavity 220 a given distance, for example 0.150". Roll pin 150 may be arranged so as to permit the axial displacement of the magnet holder 30 within the magnet cavity 220. In alternative embodiments, other retaining devices are contemplated, for example, a threaded retaining device such as a retaining screw, adhesive, or a threaded arrangement between the housing 90 and the magnet holder 30.

Still referring to FIG. 4, PCB 70 is shown mounted within PCB cavity 310 of housing 90. PCB 70 may be rigidly mounted to portions of housing 90 stood-off from the surface of cavity separating wall 230 within PCB cavity 310. Mounting PCB 70 in this manner provides a gap (e.g. about a 0.03" to 0.06" gap) between the surface of PCB 70 facing cavity separating wall 230 and cavity separating wall 230 (FIG. 5).

Referring to FIG. 5, a detailed view of section CC of FIG. 3 is shown. PCB 70 is shown with magnetic sensor 80 centrally mounted and aligned with magnet 50. Magnet sensor 80 may be positioned, for example, about 0.05" to 0.15" from magnet 50. Magnet sensor 80, configured to detect changes in the flux density and direction of the magnetic field output by the magnet 50 as the shaft rotates, substantially continuously outputs to PCB 70 signals representing magnetic field flux density and direction. By way of non-limiting example only, magnetic sensor 80 may be of the type commercially available from various manufacturers such as the model KMT32B manufactured by Measurement Specialties, Inc. the assignee herein. By way of further non-limiting example, magnet 50 may be implemented as a NdFeB magnet commercially available.

The embodiment shown in FIG. 5 includes a polyimide film 120 adhered to a surface of cavity separating wall 230 facing PCB 70 by, for example, and adhesive such as an adhesive transfer tape. Polyimide film 120 may be required as a secondary layer of insulation to meet regulatory requirements, such as the European Union requirements generally known as ATEX, for equipment for use in potentially explosive atmospheres. Alternative embodiments of encoder 200 may omit polyimide film 120.

Encoder 200 is fully assembled when PCB 70 has been installed within PCB cavity 310 and retained by PCB mounting screws 170 and magnet holder 30 has been installed within magnet cavity 220 and retained by roll pin 150. The fully assembled encoder 200 may be installed onto a piston meter according to the following steps: Encoder 200 is vertically lowered onto shaft 10 extending from the piston meter. Shaft 10 first enters magnet cavity 220, then enters magnet interface area 280 of magnet holder 30. Encoder 200 will continue to be vertically lowered, causing shaft 10 to contact foam puck 40 and to raise magnet holder 30 vertically toward cavity separating wall 230, and thus magnet 50 into proximity with the sensor 80. Once a raised center region 250 of magnet holder 30 contacts recessed portion 240 of cavity separating wall 230, shaft 10 may partially compress foam puck 40. The compression of foam puck 40 may provide continuous contact between magnet holder 30 and cavity separating wall 230 throughout operation by compensating for slight travel of shaft 10 (e.g. travel of up to about 0.06"). Housing 90 may then be retained against seal retainer 180 by rotatably inserting mounting screws 180 through bores in housing 90 and into threaded bores in seal retainer. It is understood that an encoder 200 is designed according to the specifications and dimensions of the piston meter to which it is to be installed. Accordingly, the distance from a first end of housing 90 that contacts seal retainer 20 to cavity separating wall 230 is designed according to the length of shaft 10. This design provides that that upon installation of housing 90 to a piston meter, raised center region 250 of magnet holder 30 contacts recessed portion 240 of cavity separating wall 230.

During ordinary operation of a fuel distribution system, the piston meter rotates shaft 10 according to the amount of fuel distributed. As shaft 10 rotates, magnet 50 rotates at an identical (or proportional) rate. Magnet sensor 80 substantially continuously detects changes in the flux density and direction of the magnetic field created by magnet 50 as shaft 10 rotates and outputs to PCB 70 signals representing the flux density and direction of the magnetic field. PCB 70 is coupled to a controller of a fuel pump over a communications interface, such as an encrypted RS-485 line. When the fuel pump distributes fuel, PCB 70 outputs to the controller a transmission indicating the amount of fuel distributed.

Under typical operation, magnet 50 remains at a substantially constant distance from magnetic sensor 80 (e.g. about 0.08"). Due to the vibrations of moving parts within the piston sensor, the distance between magnet 50 and magnetic sensor 80 may vary slightly under normal operating conditions. Encoder 200 thus may have a tolerance for variances of the B-field within a threshold range (e.g. variance for changes in the relative distance between magnetic sensor 80 and magnet 50 of about 0.02-0.04"). However, if magnetic sensor 80 senses a variance in the B-field greater than the threshold range corresponding to the relative distance between magnetic sensor 80 and magnet 50 (e.g. differing by greater than about 0.04), one or more processors on PCB 70 outputs an error code to the controller of the fuel pump over the communications interface. In response to the error code, the controller may shut off the fuel pump and the fuel pump may remain shut off until a reset code is entered and the entire pump is reset.

In one embodiment, because encoder 200 may be mounted substantially vertically on a piston meter, any attempt to remove encoder 200 from the piston meter results in gravity allowing the floating magnet holder 30 to be lowered away from magnetic sensor 80. Thus, any attempt by a thief or vandal to disable encoder 200 by removing it from a piston meter would result in magnetic sensor 80 detecting the attempted removal of encoder 200 and, in turn, the fuel pump would be shut down or disabled.

In addition to detecting removal of an encoder, embodiments of the present invention may also be operative to detect and/or be immune to magnetic fields introduced by devices intended to disrupt an encoder's ordinary operation. Specifically, as a result of the close spacing between magnetic sensor 80 and magnet 50 (e.g. about 0.08"), encoder 200 may be unaffected by, for example, a high flux density magnetic field generated by a powerful magnet (by way of example an electromagnet) intended to interfere with the accurate operation of magnetic sensor 80 within encoder 200. However, in the event a magnetic field is introduced having sufficient strength to alter the flux density of the sensed magnetic field outside of a predetermined range (e.g. the density corresponding to the predetermined threshold distance), PCB 70 is configured to transmit an error signal to a controller of the fuel dispenser.

The foregoing generally describes a slideable arrangement between the magnet holder 30 and the magnet cavity 220 facilitating the drop out feature of the magnet 50 with respect to the magnetic sensor 80 under the force of gravity. However, it is also envisioned that the magnet holder 30 may be biased in a direction opposite the magnetic sensor by mechanical means, such as a spring or an elastic element, thus allowing for the mounting of the encoder in an orientation other than vertically with respect to the fluid meter while retain the above-described anti-tampering arrangement.

In an embodiment, a controller may provide a visual and/or audible alert signal to an individual responsible for monitoring pump operations. The individual may then be able to provide a signal via the controller to cause the fuel pump to shut down. In another embodiment, the controller may be configured to disable the fuel pump, such as by providing an output signal that causes a switch to be opened to cut off a power supply to the pump. In another embodiment, the controller may be configured to disable the fuel pump until a suitable code indicating review by a manager or another individual at a remote location, such as review of video of the pump location by a suitable individual, is received.

Figure 7:
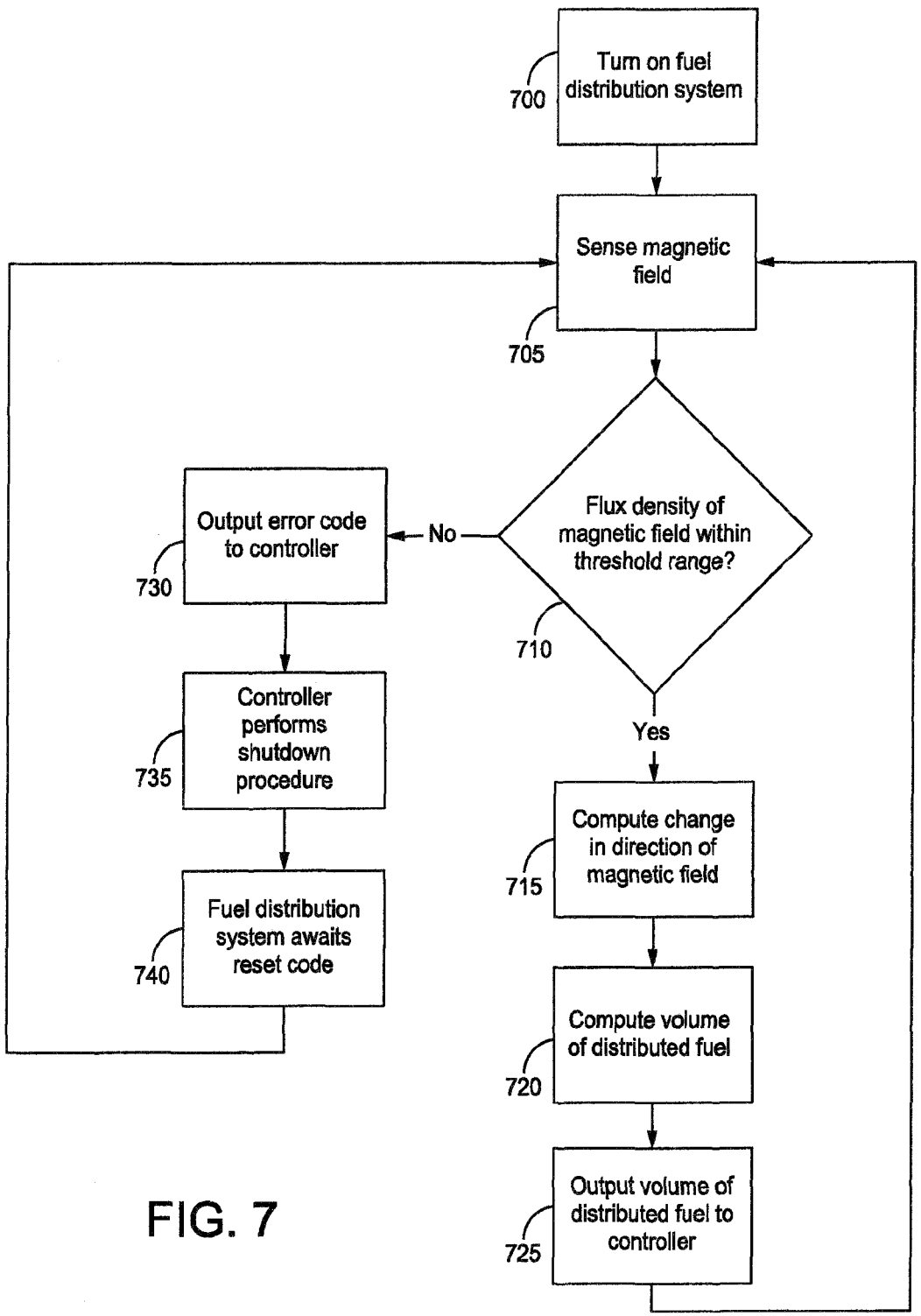
FIG. 7 is a process flow diagram for operation of an exemplary encoder according to an embodiment of the present invention.

FIG. 7 is a process flow diagram describing the operation of an exemplary encoder 200. At step 700 the fuel distribution system is turned on. Turning on the fuel distribution system may provide power to components of the system, by way of non-limiting example, encoder 200, a fuel pump and a controller. At step 705, magnetic sensor 80 senses the flux density and direction of the magnetic field created by magnet 50 and outputs a signal indicative of these characteristics to PCB 70. At step 710, a processor on PCB 70 compares the flux density detected by magnetic sensor 80 with a threshold range of flux densities corresponding to distances of magnet 50 from magnetic sensor 80. By way of example, the threshold range may correspond to distances of magnet 50 from magnetic sensor 80 ranging from 0.2" to 0.4" and may be software adjustable.

If at step 710 the processor on PCB 70 determines that the sensed flux density is above or below a threshold value, the magnet must be more than a threshold distance from the magnet sensor, or an outside magnetic field has been introduced to the sensor, and the process flow proceeds to step 730. At step 730, PCB 70 outputs an error code to the fuel distribution system's controller, for example, by transmitting a signal over an encrypted RS-485 transmission line. At step 735, the controller receives the error code and performs a shutdown procedure. At step 740, the fuel distribution system remains shut off until an authorized user (e.g. a manager) types in a reset password/code. The reset password may be entered, for example, from a remote location such as from within a building. Upon entry of the reset password the process flow returns to step 705 and resumes sensing the magnetic field.

If at step 710 the processor on PCB 70 determines that the sensed flux density is within a threshold range, the process flow proceeds to step 715. At step 715, the processor on PCB 70 computes the change in the direction of the magnetic field created by magnet 50 corresponding to the rotation of magnet 50 with shaft 10. At step 720, the processor on PCB 70 computes the amount of distributed fuel based on a predetermined calibration factor (i.e. a conversion factor correlating rotations of shaft 10 to the volume of distributed fuel). At step 725, PCB 70 outputs a signal indicative of the volume of distributed fuel to the controller board via a transmission line. After step 725, encoder 200 returns to step 705 and again magnetic sensor 80 senses the magnetic field created by magnet 50. Steps 705 through 725 may cycle (i.e. repeat) periodically/aperiodically according to a clock associated with PCB 70.

Figure 8:
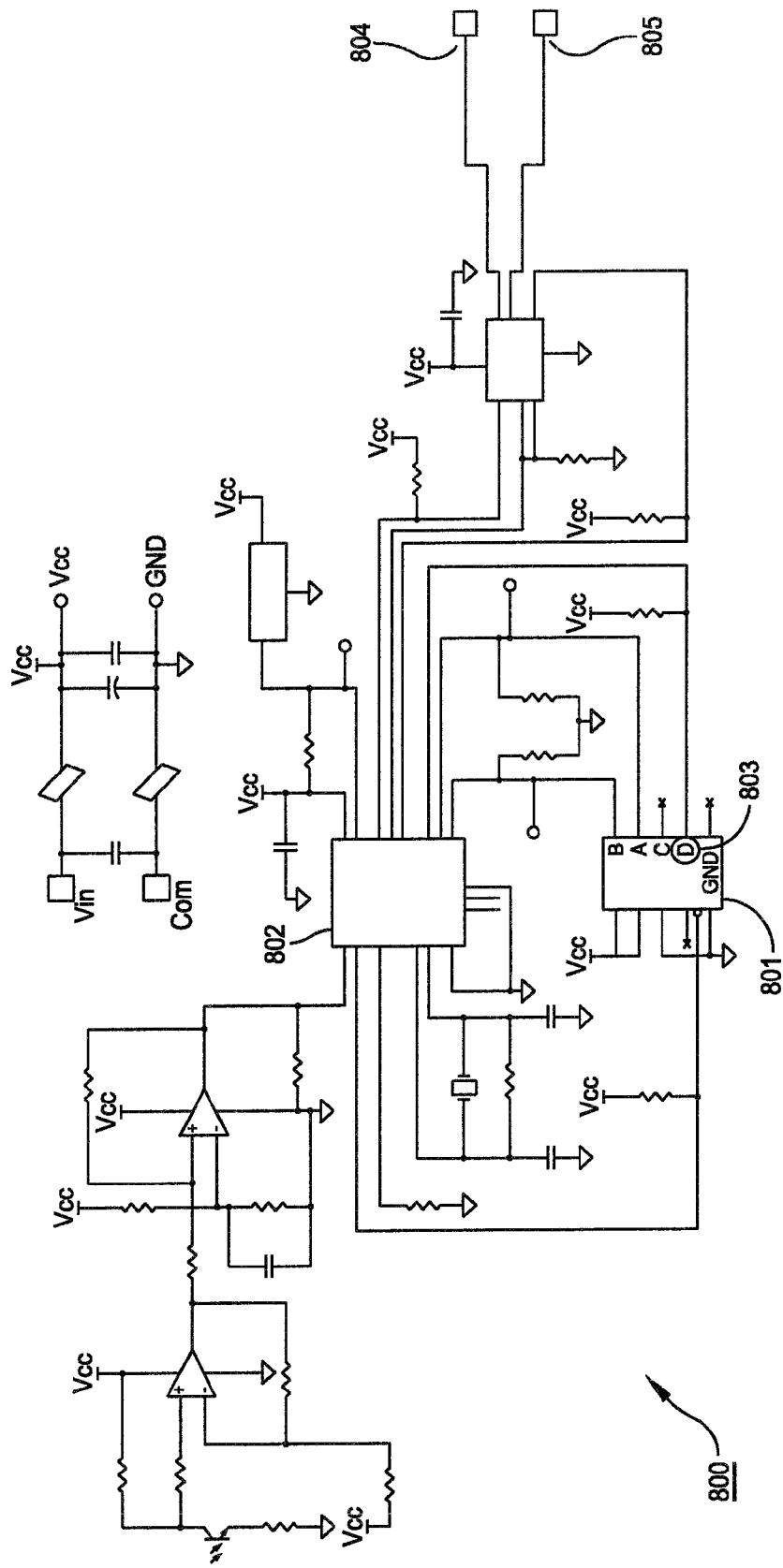
FIG. 8 is a circuit diagram of an exemplary circuit embedded on a printed circuit board according to an embodiment of the present invention.

FIG. 8 shows a circuit diagram of an exemplary circuit 800 embedded on a printed circuit board according to an embodiment of the present invention. Circuit 800 includes a microprocessor 801 configured to monitor the output of a sensor measuring the strength of a magnetic field created by a magnet (e.g. magnet 50 of the exemplary encoder 200 shown in FIG. 3). The magnetic sensor substantially continuously outputs the strength of the sensed magnetic field to microprocessor 801. When the magnetic field strength has been increased or reduced significantly, a pin 803 of microprocessor 801 changes, thereby indicating that the relative distance between the magnetic sensor and the magnet has substantially increased (e.g. the encoder has been removed from the piston meter), or that an outside magnetic field has been exposed to the sensor. A central microprocessor 802 is configured to generally monitor components embedded on the printed circuit board and to output signals to downstream components corresponding to the monitored components. By way of example, central microprocessor 802 is configured to monitor pin 803 of microprocessor 801. When pin 803 changes, central microprocessor 802 may send an alert signal to downstream components via a transmission medium (e.g. encrypted RS-485 line) operatively coupling downstream components to a first output port 804 and a second output port 805.

Alternative embodiments of the present invention may implement computer code stored on a computer readable medium, such as an optical drive or other memory by way of example only. The computer code configured to be executed performs the steps of analyzing signals indicating the flux density and direction of the magnetic field sensed by the magnetic sensor, determining if the flux density of the field is within a threshold range, outputting an error signal if the flux density is outside the threshold range, and computing and outputting a volume of distributed fuel corresponding to the change in magnetic field direction if the flux density is within the threshold range.

While the foregoing generally provides threshold magnetic flux density values corresponding to distances between the magnet sensor and the magnet, the threshold values may vary. By way of example, software instructions performed by components of PCB 70 may be modified to provide for alternative magnetic flux density threshold ranges/values thereby allowing for varying distances between the magnet sensor and the magnet.

While the foregoing describes embodiments of the present invention implementing an encoder for use within a fuel distribution system, the disclosed embodiments and alternative embodiments may be employed in systems for distribution of fluids other than fuels.

While the foregoing describes an advantage of embodiments of the present invention as preventing tampering that facilitates theft of fuel or other fluids, the present invention may be employed to detect tampering for purposes other than theft.

While the foregoing generally describes embodiments of the present invention implementing an encoder for use within a fuel distribution system, alternative embodiments of the present invention may provide a tamper-resistant encoder designed to work in highly combustible environments. By way of non-limiting example, an alternative embodiment of the present invention may be implemented to measure rotations of shafts on oil rigs or any other environment in the presence of a potentially combustible atmosphere.

While the foregoing generally describes mounting various parts via mounting screws, alternative mounting hardware may be implemented according to the requirements of an implementation of the invention. By way of example, rivets or roll pins may be implemented in the place of mounting screws. Alternatively, various components may mate by adhesively mating adjoining surfaces.

While the foregoing describes exemplary embodiments and implementations, it will be apparent to those skilled in the art that various modifications and variations can be made to the present invention without departing from the spirit and scope of the invention.

The invention claimed is:

1. An encoder for a fluid dispensing system comprising:
a magnetic sensor configured proximal to a magnet operatively associated with a rotatable output shaft of a fluid metering device, the sensor configured to generate a first output signal indicative of a sensed magnetic field associated at least in part with the magnet of the fluid metering device, the sensor and the magnet being a predetermined distance from one another, and
a controller responsive to the first output signal and configured to compare the first output signal to a predetermined threshold value associated with said predetermined distance, the controller further configured to generate a second output signal responsive to said comparison,
wherein the magnet is movable within the encoder along the axial direction of the output shaft between a first position and a second position relative to the magnetic sensor, wherein the magnet is biased into the first position when the encoder is in an installed position with respect to the fluid metering device, and
wherein the magnet is biased into a second position relative to the magnetic sensor when the magnet is not coupled to the output shaft of the fluid metering device.

2. An encoder for a fluid dispensing system comprising:
a magnetic sensor configured proximal to a magnet operatively associated with a rotatable output shaft of a fluid metering device, the sensor configured to generate a first output signal indicative of a sensed magnetic field associated at least in part with the magnet of the fluid metering device, the sensor and the magnet being a predetermined distance from one another, and
a controller responsive to the first output signal and configured to compare the first output signal to a predetermined threshold value associated with said predetermined distance, the controller further configured to generate a second output signal responsive to said comparison, wherein the second output signal is operative to disable the fluid dispensing system.

3. The encoder of claim 1, wherein the predetermined threshold value corresponds to at least one of the strength and direction of a magnetic field generated by the magnet relative to the magnetic sensor.

4. The encoder of claim 3, wherein the magnet is arranged within a magnet holder.

5. The encoder of claim 4, wherein the magnet holder is configured to couple with the output shaft of the fluid metering device.

6. The encoder of claim 2, wherein the magnet is movable within the encoder along the axial direction of the output shaft between a first position and a second position relative to the magnetic sensor, wherein the magnet is biased into the first position when the encoder is in an installed position with respect to the fluid metering device.

7. The encoder of claim 6, wherein the predetermined threshold value corresponds to a magnetic field strength indicative of the first position of the magnet.

8. The encoder of claim 6, wherein the magnet is biased into a second position relative to the magnetic sensor when the magnet is not coupled to the output shaft of the fluid metering device.

9. The encoder of claim 8, wherein the magnetic field strength between the magnet and the magnetic sensor when the magnet is arranged in the second position is above or below the predetermined threshold value.

10. The encoder of claim 1, wherein the magnet is biased into the first position by the output shaft.

11. The encoder of claim 1, wherein the magnet is biased into the second position by the force of gravity.

12. The encoder of claim 5, wherein the magnet holder and magnet are configured to rotate with the output shaft.

13. The encoder of claim 4, wherein the magnet holder is moveably arranged within a housing of the encoder.

14. The encoder of claim 1, wherein the predetermined threshold value comprises a range of values.

15. A method of operating an encoder for a fluid dispensing system, the method comprising the steps of:

sensing a magnetic field generated at least in part by a magnet operatively associated with a rotatable output shaft of a fluid metering device with a magnetic sensor, the magnetic sensor configured proximal to the magnet and configured to generate a first output signal indicative of a sensed magnetic field associated at least in part with the magnet of the fluid metering device;

comparing the first output signal to a predetermined threshold value indicative of a predetermined distance between the magnet and a magnetic sensor with a controller; and generating a second output signal responsive to said comparison by the controller when the first output signal is above or below the threshold value, wherein the magnet is movable within the encoder between a first position and a second position relative to the magnetic sensor, wherein the magnet is biased into the first position when the encoder is in an installed position with respect to the fluid metering device, and wherein the magnet is biased into the second position relative to the magnetic sensor when the encoder is at least partially uninstalled from the fluid metering device.

16. The method of claim 15, further comprising the step of disabling the fluid dispensing system in response to the generation of the second output signal.

17. A method of operating an encoder for a fluid dispensing system, the method comprising the steps of:

coupling the encoder to an output shaft of a fluid metering device, wherein a magnet is arranged on the output shaft;

sensing a magnetic field generated at least in part by the magnet operatively associated with the output shaft;

comparing the sensed magnetic field to a predetermined threshold value indicative of a predetermined distance between the magnet and a magnetic sensor, wherein coupling the encoder to the output shaft biases the magnet into a first position with respect to the magnetic sensor, the first position corresponding to a magnetic field indicative of the predetermined threshold value;

generating an output signal responsive to said comparison;

biasing the magnet into a second position upon the removal of the output shaft from the encoder, the second position corresponding to a sensed magnetic field above or below the predetermined threshold value, wherein the step of sensing a magnetic field generated by the fluid dispensing system comprises arranging the magnet on a portion of the fluid dispensing system at the predetermined distance to the magnetic sensor arranged with an encoder.

18. An encoder for a fluid dispensing system comprising:

a magnetic sensor configured proximal to a magnet operatively associated with a fluid metering device, the sensor configured to generate a first output signal indicative of a sensed magnetic field associated at least in part with the magnet of the fluid metering device, the sensor and the magnet being a predetermined distance from one another, and a controller responsive to the first output signal and configured to compare the first output signal to a predetermined threshold value associated with said predetermined distance, the controller further configured to generate a second output signal when the first output signal is above or below the threshold value, wherein the magnet is movable within the encoder between a first position and a second position relative to the magnetic sensor, wherein the magnet is biased into the first position when the encoder is in an installed position with respect to the fluid metering device, and wherein the magnet is biased into the second position relative to the magnetic sensor when the encoder is at least partially uninstalled from the fluid metering device.

19. The encoder of claim 18, wherein the predetermined threshold value corresponds to a magnetic field strength indicative of the first position of the magnet.

20. The encoder of claim 18, wherein the magnet is operatively associated with an output shaft of the fluid metering device, and the magnetic is movable within the encoder along the axial direction of the output shaft.

21. The encoder of claim 20, wherein the output shaft is a rotatable output shaft.

22. The encoder of claim 1, wherein the second output signal is generated when the first output signal is above or below the threshold value.

* * * * *